(12) United States Patent
Lambourne et al.

(10) Patent No.: US 12,283,850 B2
(45) Date of Patent: Apr. 22, 2025

(54) METAL COIL FABRICATION

(71) Applicant: ROLLS-ROYCE plc, London (GB)

(72) Inventors: Alexis Lambourne, Belper (GB); Iain Todd, Sheffield (GB); Geraint W Jewell, Sheffield (GB)

(73) Assignee: ROLLS-ROYCE plc, London (GB)

( * ) Notice: Subject to any disclaimer, the term of this patent is extended or adjusted under 35 U.S.C. 154(b) by 611 days.

(21) Appl. No.: 17/474,687

(22) Filed: Sep. 14, 2021

(65) Prior Publication Data

US 2021/0408858 A1     Dec. 30, 2021

Related U.S. Application Data

(63) Continuation of application No. 16/269,152, filed on Feb. 6, 2019, now Pat. No. 11,177,712.

(30) Foreign Application Priority Data

Feb. 16, 2018  (GB) ...................................... 1802534

(51) Int. Cl.
*H02K 15/00*  (2025.01)
*B05D 5/12*  (2006.01)
(Continued)

(52) U.S. Cl.
CPC ............... *H02K 15/00* (2013.01); *B05D 5/12* (2013.01); *B22F 10/60* (2021.01); *B22F 10/64* (2021.01); *B33Y 10/00* (2014.12); *B33Y 80/00* (2014.12); *H01F 5/06* (2013.01); *H01F 41/04* (2013.01); *H02K 3/12* (2013.01); *H02K 3/18* (2013.01);
(Continued)

(58) Field of Classification Search
CPC ........ H02K 15/02; H02K 15/045; H02K 3/18; H02K 3/28; H02K 15/0435; H02K 3/26; H02K 3/12; H02K 15/0407; H02K 19/02; H02K 3/32; H02K 15/00; B22F 5/00; B22F 3/26; B22F 10/64; B22F 10/60; H01F 5/06; H01F 41/04; B33Y 10/00; B33Y 80/00; B05D 5/12
See application file for complete search history.

(56) References Cited

U.S. PATENT DOCUMENTS 4,701,648 A    10/1987 Haditsch
5,955,810 A    9/1999 Umeda et al.
(Continued)

FOREIGN PATENT DOCUMENTS

CN    107170564 A  *  9/2017
CN    107689717 A     2/2018
(Continued)

OTHER PUBLICATIONS

EP-2387135-A2 machine translation Mar. 23, 2024.*
(Continued)

*Primary Examiner* — Leda T Pham
(74) *Attorney, Agent, or Firm* — Oliff PLC

(57) ABSTRACT

A 3D printed metal coil for an electrical machine. The 3D printed coil has a plurality of turns and is configured to fit within a slot in an electrical machine. A cross-sectional shape of successive turns of the plurality of turns varies such that a portion of each turn forms a part of an external surface of the metal coil, the external surface forming an interface with a side of the slot.

18 Claims, 5 Drawing Sheets

(51) Int. Cl.
| | |
|---|---|
| *B22F 10/60* | (2021.01) |
| *B22F 10/64* | (2021.01) |
| *B33Y 10/00* | (2015.01) |
| *B33Y 80/00* | (2015.01) |
| *H01F 5/06* | (2006.01) |
| *H01F 41/04* | (2006.01) |
| *H02K 3/12* | (2006.01) |
| *H02K 3/18* | (2006.01) |
| *H02K 3/26* | (2006.01) |
| *H02K 3/28* | (2006.01) |
| *H02K 3/32* | (2006.01) |
| *H02K 15/02* | (2006.01) |
| *H02K 15/0407* | (2025.01) |
| *H02K 15/043* | (2025.01) |
| *H02K 19/02* | (2006.01) |
| *B22F 10/25* | (2021.01) |
| *B22F 10/28* | (2021.01) |
| *B22F 10/32* | (2021.01) |
| *B22F 10/80* | (2021.01) |

(52) U.S. Cl.
CPC ............... *H02K 3/26* (2013.01); *H02K 3/28* (2013.01); *H02K 3/32* (2013.01); *H02K 15/02* (2013.01); *H02K 15/0407* (2013.01); *H02K 15/043* (2025.01); *H02K 15/0431* (2025.01); *H02K 19/02* (2013.01); *B22F 10/25* (2021.01); *B22F 10/28* (2021.01); *B22F 10/32* (2021.01); *B22F 10/80* (2021.01)

(56) References Cited

U.S. PATENT DOCUMENTS

| | | | |
|---|---|---|---|
| 10,056,813 B2 * | 8/2018 | Rozinsky | H02K 15/022 |
| 10,254,499 B1 | 4/2019 | Cohen et al. | |
| 10,730,142 B2 | 8/2020 | Zurecki et al. | |
| 10,889,098 B2 | 1/2021 | Yamazaki et al. | |
| 11,196,322 B2 * | 12/2021 | Fuchs | H02K 3/50 |
| 11,594,920 B2 * | 2/2023 | Kislev | H02K 15/066 |
| 11,831,202 B2 * | 11/2023 | Kislev | H02K 1/02 |
| 2002/0153799 A1 | 10/2002 | Kurahashi et al. | |
| 2008/0106157 A1 | 5/2008 | Higashimura et al. | |
| 2010/0259124 A1 | 10/2010 | Bodin et al. | |
| 2010/0275436 A1 | 11/2010 | Kiyono et al. | |
| 2013/0200743 A1 | 8/2013 | Okimitsu | |
| 2015/0207374 A1 | 7/2015 | Tsuiki et al. | |
| 2015/0244214 A1 | 8/2015 | Kreidler et al. | |
| 2016/0111933 A1 | 4/2016 | Takimoto | |
| 2017/0063183 A1 | 3/2017 | Shrestha et al. | |
| 2017/0125165 A1 | 5/2017 | Prest | |
| 2018/0019626 A1 | 1/2018 | Tsai et al. | |

FOREIGN PATENT DOCUMENTS

| | | | |
|---|---|---|---|
| EP | 0235597 A2 | 9/1987 | |
| EP | 1263118 A2 | 12/2002 | |
| EP | 1294076 A2 | 3/2003 | |
| EP | 2017854 A1 | 1/2009 | |
| EP | 2387135 A2 * | 11/2011 | ............ H02K 15/04 |
| EP | 2544339 A1 | 1/2013 | |
| GB | 2549931 A | 11/2017 | |
| JP | S58-165645 A | 9/1983 | |
| JP | S62-89455 A | 4/1987 | |
| JP | 2000-152563 A | 5/2000 | |
| JP | 2004-72824 A | 3/2004 | |
| KR | 20130119098 A | 10/2013 | |
| WO | 2015/007456 A2 | 1/2015 | |

OTHER PUBLICATIONS

CN-107170564-A machine translation Mar. 23, 2024.*
Feb. 7, 2022 Search Report issued in British Patent Application No. 2112435.9.
Jan. 7, 2019 Search Report issued in British Patent Application No. 1802534.6.
Jul. 10, 2018 Search Report issued in British Patent Application No. 1082534.6.
Jan. 7, 2019 Search Report relating to claim 15 issued in British Patent Application No. 1802534.6.
Aug. 27, 2024 Office Action issued in U.S. Appl. No. 17/474,793.

* cited by examiner

METAL COIL FABRICATION

This is a Continuation of application Ser. No. 16/269,152 filed Feb. 6, 2019, which claims priority to British Application No. 1802534.6 filed Feb. 16, 2018. The entire disclosures of the prior applications are hereby incorporated by reference herein their entirety.

FIELD OF THE PRESENT DISCLOSURE

The present disclosure relates to a method for fabricating a metal coil for an electrical machine.

BACKGROUND

A typical electrical motor comprises a rotor, which is mounted on a shaft, and a stator. The rotor is supported by bearings, which allow the rotor to turn on its axis, thereby allowing the rotor to turn the shaft relative to the stator in order to deliver mechanical power. The stator comprises a plurality of thin metal sheets, or laminations, of a soft magnetic material, such as silicon steel or cobalt-iron. The laminations of the stator are shaped such that they form alternating teeth and slots in the stator. Each slot is filled with turns of a metal wire coil. When the coils are energised, i.e. when a current flows through the turns, each tooth acts as a magnetic pole of the electrical machine. By energising the coils in sequence, magnetic poles are turned on and off in sequence, which induces the rotor to rotate on its axis.

A typical electrical generator is similarly configured, but instead of delivering mechanical power, it converts mechanical power in the form of rotation of the rotor to electrical power generated in the coils of the stator.

The power density of an electrical machine (whether a motor, a generator, or another type of machine such as an actuator) depends on two factors; the magnetic loading (i.e. how much magnetic flux each tooth can carry), and the electrical loading (i.e. how much electrical load the coil in each slot can carry). Increasing the magnetic loading and/or the electrical loading of the electrical machine increases the power density of the electrical machine.

In conventional electrical machines, each slot has an approximately rectangular cross section, and the wire of the metal coils has a circular, or round, cross-section. Regardless of the size of the cross-section and the packing arrangement of the wire in the slot, there are always spaces between different turns of the wire and between the turns of the wire and the sides of the slot. In other words, there are always spaces in each slot which are not filled with metal wire. Instead, these spaces are filled with a combination of air and insulating material. Insulating material is required between the turns of the coil in order to prevent short circuits, and ultimately to prevent failure of the coil. In conventional electrical machines, as little as 45% of the cross sectional area of each slot may be filled with metal wire, the remaining 55% of the cross sectional area being filled with a combination of air and insulating material.

Thus in order to increase the electrical load, the turns of the metal coils must be more densely packed in the slots so that there are fewer and/or smaller spaces between the turns of the metal coil. In other words, the packing factor of the wire in the slots of the stator must be increased.

One approach to increasing the packing factor is to use metal wire with a rectangular cross section. However, such wires can be more difficult to bend or manipulate into coils as they are stiffer than wires with a circular cross section. Furthermore, kinking or creasing at the sharp edges of wire with a rectangular cross section can result in damage to insulating material surrounding the metal coil. This in turn can lead to corona discharge and failure of the coil.

Another approach to increasing the packing factor is to use multi stranded wire, commonly known as Litz wire. Thin strands of metal wire can be compressed, twisted and woven together into high packing factor bundles which are then wound to form the turns of a coil. Litz wire is generally easier to manipulate than solid rectangular metal wire. Moreover, because of the low cross-sectional area of the individual strands, Litz wire bundles also reduce the increase in resistance of a metal wire that takes place at higher frequencies, and therefore reduce electromagnetic losses at higher frequencies compared to conventional metal wire.

However, each individual thin strand of metal wire woven into the Litz wire bundle is coated in a layer of insulating material. Therefore, although the wire bundles can be packed efficiently, a substantial proportion of the cross sectional area of each slot is still filled with insulating material. In other words, although there may be fewer spaces between the metal wires that are filled with air, these spaces have simply been replaced with spaces filled with insulating material. The insulating material of Litz wire bundles can also be easily damaged during the manipulation of the bundles into metal coils.

SUMMARY OF THE DISCLOSURE

The present disclosure aims to provide a metal coil that can better fit within the slots of a stator, for example so that the packing factor of the turns of the coil is increased. Such a coil can result in a higher electrical loading, and therefore an increased power density of an electrical machine.

Accordingly, the present disclosure provides in a first aspect a method for fabricating an insulated metal coil for an electrical machine including: 3D printing a metal coil having a plurality of turns; and subsequently infiltrating insulating material between the turns of the metal coil to electrically insulate the turns from each other.

By 3D printing the metal coil, the configuration of the coil can be modelled and defined for its specific application. The turns of wire in the coil can be densely packed in a slot of a stator such that the total cross-sectional area of the wire in the slot is increased. Therefore, the packing factor is increased and the electrical loading and power density of the electrical machine is increased. Furthermore, the cross-sectional shape and/or area of the turns of the metal coil can be varied within the coil itself. Also, rather than printing the coil and the insulating material simultaneously in a combined 3D printing process, the metal coil is printed before infiltrating the insulating material. This helps to prevent the metal coil from picking up impurities from the insulating material.

Optional features of the method of the first aspect will now be set out. These are applicable singly or in any combination.

The method may further include locating spacers between the turns of the metal coil to space the turns from each other before infiltrating the insulating material.

Locating spacers between the turns of the coil helps to prevent turn-to-turn short circuits.

The method may further include curing the infiltrated insulating material.

The method may further include modelling a coil geometry based on an intended electrical loading of the metal coil and/or a thermal analysis of the electrical machine, the metal coil being 3D printed to the modelled coil geometry. Modelling the coil geometry based on the intended electrical loading of the metal coil allows factors such as slot depth, slot-to-tooth ratio, cross sectional area of wire and packing factor of wire in the slot to be defined. Modelling the coil geometry based on the thermal analysis of the electrical machine allows factors such as heat dissipation area, peak coil temperature, contact area of the coil to the slot and end winding geometry to be defined and modelled. Advantageously, the combination of thermal and electrical requirements can then be used to define the coil geometry.

The metal coil may be a copper coil. For example, copper powder having a diameter within the range of 50-100 μm may be used for 3D printing the coil. Copper powder having a diameter within this range is particularly suitable for the flow and handling characteristics of a 3D printer. However, it should be noted that the wire could formed of another electrically conductive metal, such as aluminium.

The 3D printing may be performed in an oxygen free environment. Maintaining an oxygen free environment by means of an inert gas or vacuum reduces the risk of oxygen contamination, which can impair the electrical conductivity of the wire. Therefore, the electrical conductivity of the wire can be improved.

The method may further include annealing the metal coil to reduce or remove residual stresses in the coil before infiltrating the insulating material.

The method may further include heat treating the metal coil in an inert atmosphere to improve the electrical conductivity of the coil before infiltrating the insulating material. The heat treating can be performed using a hot isostatic pressure (HIP) furnace. The combination of an increased temperature and increased pressure in the HIP furnace can enhance the electrical conductivity of the wire. Generally, the increased pressure contributes to healing, or closing up, of residual porosity, and the increased temperature results in grain crystallization and grain growth.

The insulated metal coil may be configured to fit within a slot in the electrical machine, and the plurality of turns of the metal coil may have configurations such that a portion of each turn forms a part of an external surface of the metal coil, the external surface of the metal coil forming an interface with a side of the slot. In this way, thermal management of the coil can be improved. In other words, each turn can have an external heat sink to the side of the slot.

The cross-sectional shape of the turns of the coil may vary for successive turns, typically with the cross-sectional area remaining the same for successive turns. This shape variation is known as grading. As an example, the cross-sectional shape of the turns may transition from square-like to more rectangular, and vice versa. As the portions of the coil exiting a slot and turning to re-enter another slot, also known as end-windings, are not positioned within a slot but are instead exposed to air or coolant, it is beneficial to extract heat from the coils at the end-windings. Therefore, each turn may be graded to transition at the end windings from having e.g. a rectangular cross sectioned bar-like shape within a slot to having e.g. a flat plate-like shape at the end winding, thereby increasing the surface area of the end windings while maintaining the cross sectional area for current flow. Heat dissipation can therefore be improved in the end windings while the current-carrying capacity of the coil remains the same.

The metal coil may be 3D printed with termination features at the ends of the coil. Termination features may include threaded fittings or spade connectors. By 3D printing the termination features, a manufacture stage may be removed when compared to a conventional process for fabricating insulated metal coils. Accordingly, efficiency of fabricating the insulated metal coil may be improved.

The present disclosure provides in a second aspect a process for fabricating a stator of an electrical machine, the process including: performing the method of the first aspect; and fitting the fabricated insulated metal coil into slots of the stator of the electrical machine.

The present disclosure provides in a third aspect an insulated metal coil fabricated according to the method of the first aspect.

The present disclosure provides in a fourth aspect, an insulated metal coil having a plurality of turns and being configured to fit within a slot in an electrical machine, the coil being further configured such that a portion of each turn forms a part of an external surface of the metal coil, the external surface forming an interface with a side of the slot. For example, by varying the cross-sectional shapes of the turns of the coil, each turn can form an interface with a side of the slot in order to improve thermal management of the coil. In other words, each turn can have an external heat sink to the side of the slot.

The present disclosure provides in a fifth aspect, an insulated metal coil for an electrical machine, the coil having a plurality of turns, and the cross-sectional shape of the turns of the coil varying for successive turns, preferably with the cross-sectional area of the turns remaining the same for successive turns.

The insulated metal coil of the fourth or fifth aspect may be fabricated according to the method of the first aspect.

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES 3D printing, also known as direct laser deposition (DLD), selective laser melting (SLM), additive layer manufacture (ALM) and direct metal deposition (DMD), is a process which uses a directed energy source such as a laser or electron beam to create 3D objects from a powder. The directed energy source melts, sinters or fuses together the powder into a 3D object based on a geometry predetermined by a computer generated CAD (computer aided design) model file, a 3D scanner or a digital camera and photogrammetry software.

Figure 1:
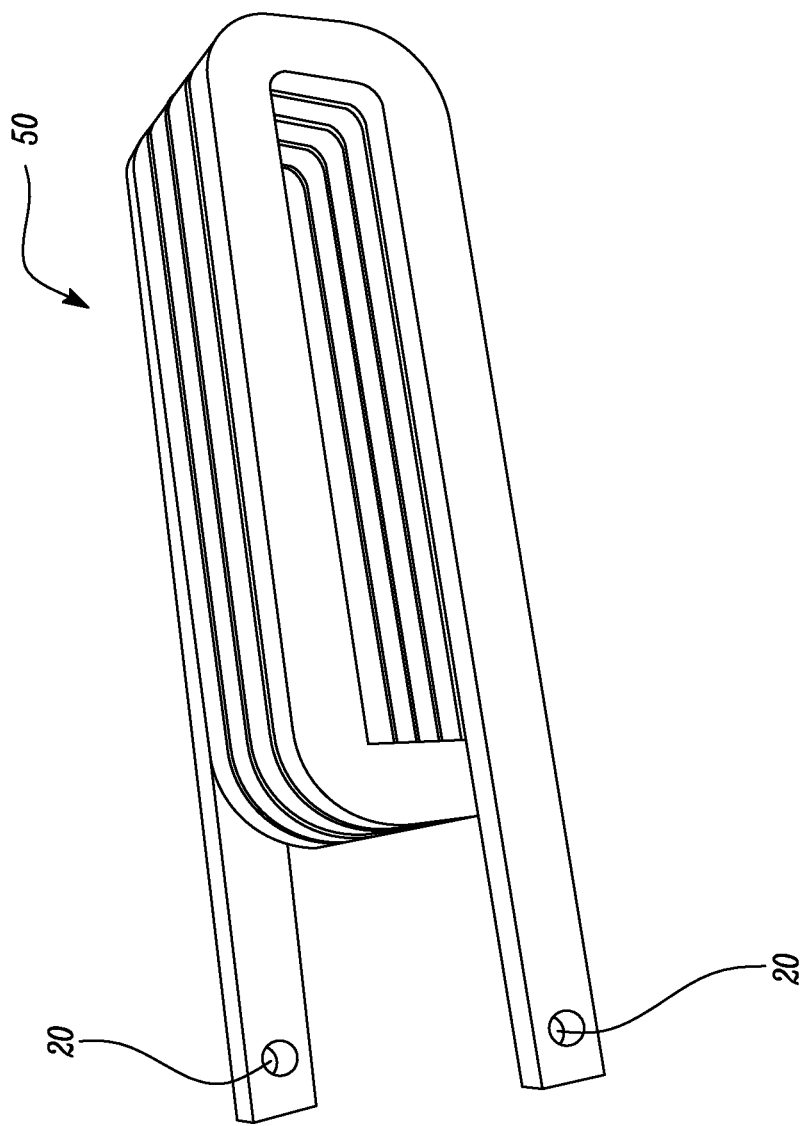
FIG. 1 shows a metal coil with a high packing factor.

It is possible to 3D print metal, such as copper, into a metal coil having a plurality of turns, such as the metal coil 50 shown in FIG. 1. More specifically, it is possible to 3D print a copper coil using a blown powder or powder bed and an electron beam or laser process.

A 3D printed metal coil can be designed using a computer-aided design (CAD) package to have a particular shape and configuration. In this way, 3D printed metal coils can be configured to suit a particular slot geometry in an electrical machine such that a high packing factor of the coil within the slot is achieved.

Figure 2:
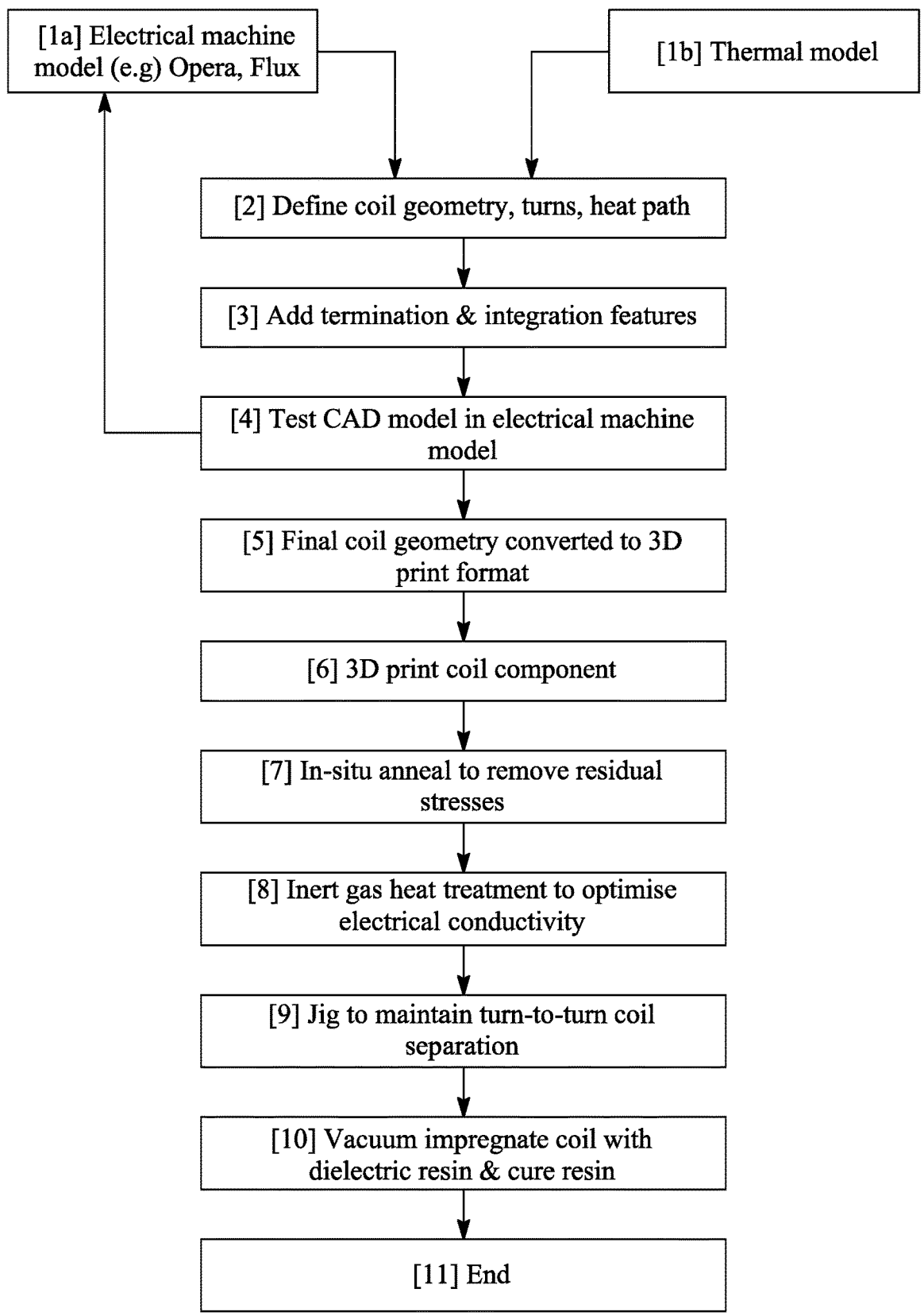
FIG. 2 shows a flow chart of a method of fabricating an insulated metal coil.

FIG. 2 shows a flow chart of a method of fabricating an insulated metal coil using 3D printing. In this example, an insulated copper coil is fabricated, although a similar method could be used to fabricate a coil made from a powder of another metal, such as aluminium.

At step 1a, an intended electrical loading of the insulated copper coil is defined and modelled to produce an electrical machine model. Software such as Flux 3D™ from Altair™ HyperWorks™ or Opera™ from Cobham™ can be used for the modelling of electrical loading of the coil into an electrical machine model. Factors such as slot depth, slot-to-tooth ratio, cross section of copper, and packing factor of the copper coil are defined in the electrical machine model.

At step 1b, an analysis of heat inputs from the environment and/or self-heating of the electrical machine is carried out in a thermal analysis of the electrical machine, and a thermal model is produced. Self-heating may result from resistive losses and/or eddy current losses in the coil. Factors such as heat dissipation area, peak coil temperature, contact area of the coil to the slot and end winding geometry are defined in the thermal model.

The electrical machine model and the thermal model may be separate or integrated models.

At step 2, a coil geometry is modelled and generated based on the electrical machine model and the thermal model using a CAD package to produce a CAD model file. The generated coil geometry can be modelled to increase the packing factor of the coil within the slot. Specifically, the cross sectional area of the wire in the slot can be increased, and the cross sectional area of the space containing a combination of air and insulating material is decreased.

Figure 3:
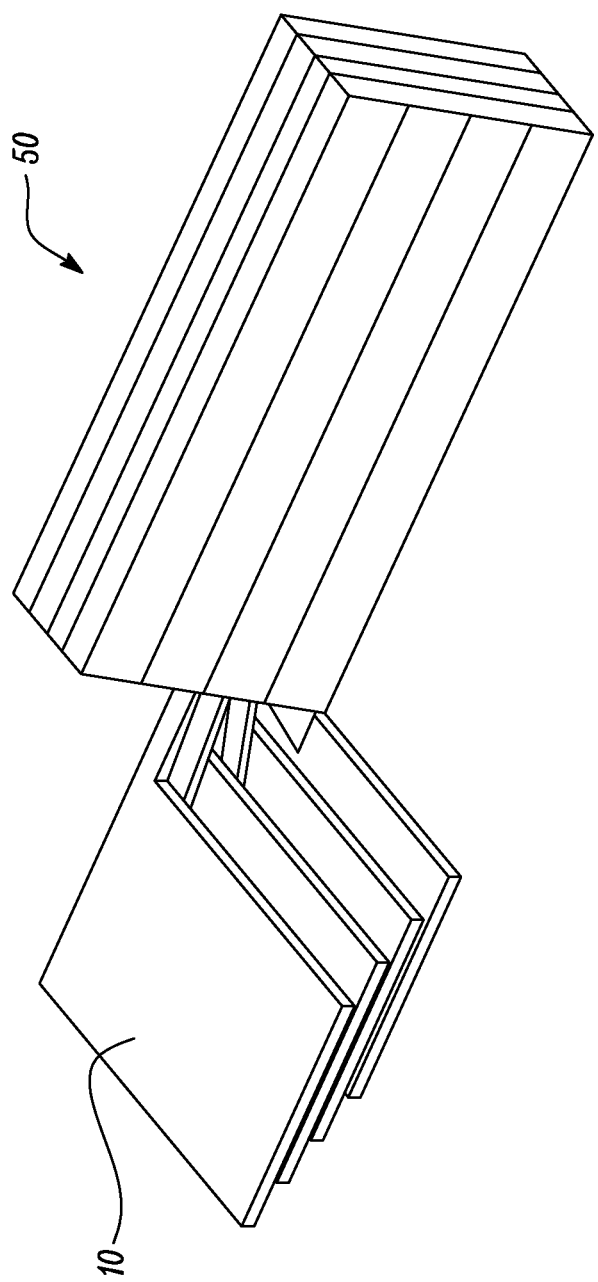
FIG. 3 shows grading of a metal coil to form improved end windings.
Figure 6:
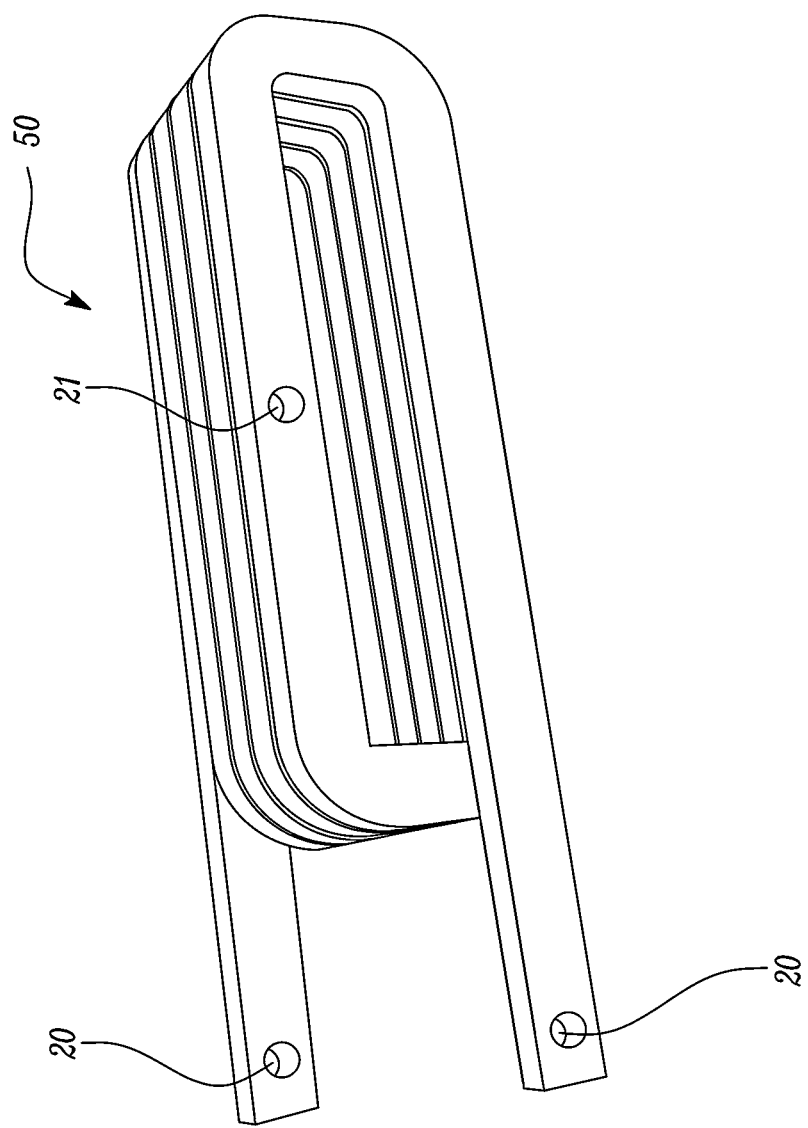
FIG. 6 shows another metal coil with a high packing factor.

At step 3, integration and/or termination features may be added to the generated coil geometry in the CAD model file. Specifically, connectors such as spade connectors, pockets 21 (see FIG. 6) for thermocouples or other sensors, coolant channels, heat sinks, heat dissipation surfaces and threaded fittings may be added to the CAD model file. Such integration and/or termination features are added to the CAD model file so that they can be 3D printed as part of the metal coil. For example, FIG. 1 shows integral terminal connectors 20 at the ends of the coil 50, and in FIG. 3 heat dissipation surfaces 10 are shown integrated with the end windings of the coil 50. More particularly, in FIG. 3, each turn is graded to transition at the end windings from having a rectangular cross sectioned bar-like shape, to a flat plate-shaped heat dissipation surface 10, thereby increasing the surface area of the end winding exposed to air or motor coolant, whilst maintaining the same cross-sectional area for current flow. Therefore, heat dissipation is improved in the end windings, but the current carrying capacity of the coil remains the same.

The integration and/or termination features can improve the thermal management of the copper coil such that changes in electrical resistance can be reduced, and therefore the efficiency of the electrical machine is improved. Advantageously, these features do not need to be added to the coil later on in the fabricating process, thereby improving the efficiency of the fabrication of the insulated metal coils.

At step 4, the generated coil geometry in the CAD model file is tested in the electrical machine model to check that the intended electrical loading is achieved. If the intended electrical loading is not achieved, further optimization cycles may be carried out by repeating steps 1a, 1b, 2 and 3 until the intended electrical loading is achieved. If the intended electrical loading is achieved, the calculated coil geometry becomes the final coil geometry which is used for the 3D printing.

At step 5, the final coil geometry in the CAD model file is converted into a 3D print format to be 3D printed. The 3D print format depends on the 3D printing machine used to fabricate the coils. Typically the 3D print format is an .stl file.

At step 6, the copper coil is 3D printed using the 3D printing machine. The copper powder used should be suitable for the flow and handling characteristics required by the 3D printing machine. Super pure copper powder having a diameter in the range of 50-100 μm is generally suitable. The 3D printing can be performed in an oxygen free environment in order to reduce the risk of oxygen contamination, which impairs the electrical conductivity of the wire. An oxygen free environment is achieved by means of an inert gas or vacuum.

Rapid cooling of the copper as it is deposited by the 3D printer results in residual stresses. In step 7, the copper coil is annealed within the 3D printing machine in an in situ stress release process in order to reduce or eliminate these residual stresses. The annealing temperature of copper is within the range of 250–750° C. An oxygen free environment is maintained.

3D printing can result in a fine grained copper coil with some residual porosity. Both porosity and small grain sizes may lead to an increased electrical resistance. This effect is reduced at step 8, by heat treatment of the copper coil in a hot isostatic pressure (HIP) furnace. Increased temperature, increased pressure, and an inert environment in the HIP furnace enhances the electrical conductivity of the copper wire. Specifically, the increased temperature (usually >850° C.) results in grain recrystallization and grain growth, and the increased pressure aids in closing up, or healing, the porosity.

An insulating process begins at step 9. Here, each turn of the coil is separated from one another in order to prevent turn-to-turn short circuits. Specifically, spacers are inserted between each turn. Masking is added to some areas, such as interconnects, which do not require a coating of insulation material.

At step 10, the insulating material is infiltrated between each turn such that each turn is coated in insulating material. The insulating material should reach and coat all turns of the copper coil. Examples of suitable insulating materials include dielectric resins such as polyester, epoxy, PVC, polyimide Kapton, PTFE or silicone. The insulating material can be infiltrated by a number of techniques, including dipping, spraying, vacuum infiltration or powder coating. The spacers inserted at step 9 become incorporated into the insulating material to form an overall insulating system. Preferably, the spacers inserted at step 9 are fabricated from the same material as the insulating material. The insulating material is then cured. Curing can be carried out by cooling, UV curing, condensation curing, polymerisation, cross-linking or other types of polymer curing processes.

At step 11, the insulated copper coil is complete and can be inserted into slots of an electrical machine.

Figure 4B:
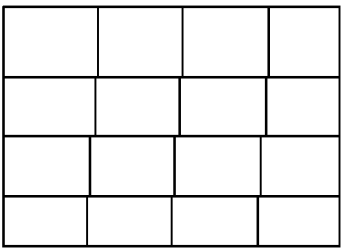
FIG. 4B shows a cross section through a metal coil having a varied cross sectional shape.
Figure 4A:
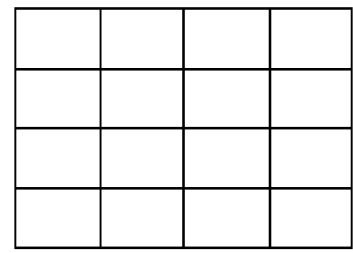
FIG. 4A shows a cross section through a metal coil with a constant cross sectional shape.

The design flexibility of 3D printing allows the cross-section of each turn to be varied, or different from one another. Therefore, as well as integration and/or termination features discussed above in respect of FIGS. 1 and 3, the cross section of each turn of metal wire in the coil may be a different configuration, size or shape. FIG. 4A shows a coil with wire of constant cross-sectional shape. In contrast, 3D printing the coil allows the cross-sectional shape of the wire to be varied for successive turns of the coil, as shown in FIG. 4B.

Figure 5:
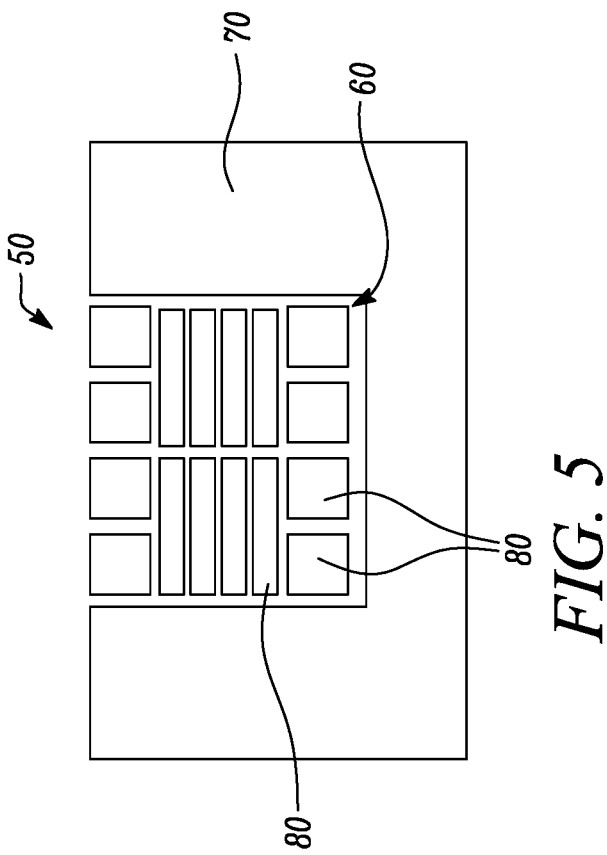
FIG. 5 shows a cross section through another metal coil.

In particular, the cross-sectional shape of the wire may be varied to allow each turn to have access to a side of the slot in order to improve thermal management of the coil. An example of a cross section of an insulated metal coil 50, the insulated metal coil 50 being configured to fit within a slot 60 in a stator core 70 of an electrical machine, is shown in FIG. 5. The plurality of turns 80 have different cross-sectional shapes such that a portion of each of the turns 80 forms a part of an external surface of the metal coil, the external surface forming an interface with a side of the slot 60.

As each of the turns 80 can be in contact with a side of the slot 60, each turn has an external heat sink to the stator core 70. Therefore, in-slot cooling can be improved. However, in this example, the cross sectional area of each turn is not varied so that the current-carrying capacity of each turn is maintained.

Even if it is not possible to configure the turns such that they all form an interface with a side of the slot, a substantial proportion of the turns may form such an interface.

One or more of the following benefits can follow from the improved packing factor obtainable by 3D printing the coil.
- If the dimensions of the slot are unchanged, due to the improved packing factor there can be an increase in the amount of wire in each slot and so a reduction in the current density in the wire. Therefore, there are less electrical losses, resulting in an improved efficiency of the electrical machine.
- If the slot depth is reduced such that the metal density in the slot is unchanged, an outer diameter of the stator can be reduced. Therefore, the mass and volume of the stator is reduced, and so losses in the stator core are reduced. Again, this results in an improved efficiency of the electrical machine.
- If the width of the slot is reduced whilst maintaining both the slot depth and overall cross sectional area of metal in the slot, the teeth of the stator increase in volume. Therefore, the tooth flux density decreases and there is a reduction in electrical losses from the teeth of the stator. Again, this results in an improved efficiency of the electrical machine.
- If the slot width is reduced, leaving the tooth width unchanged, this can also result in a reduction of stator losses, and therefore an improvement in efficiency of the electrical machine.

In general reducing the slot depth is the most effective option for improving the efficiency of the electrical machine. Furthermore, there are additional benefits in reducing the slot depth, such as a reduction of outer diameter of the stator and a reduction of weight of the stator.

The insulated metal coil may be used in a motor, a generator, an actuator or another type of electrical machine.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

The invention claimed is:

1. A 3D printed metal coil for an electrical machine, the 3D printed metal coil having a plurality of turns and being configured to fit within a slot in an electrical machine, wherein a cross-sectional shape of successive turns of the plurality of turns varies such that a portion of each turn forms a part of an external surface of the 3D printed metal coil, the external surface forming an interface with a side of the slot, and the 3D printed metal coil having one or more 3D printed pockets in a coil layer of the 3D printed metal coil for thermocouples or other sensors.

2. The 3D printed metal coil of claim 1, wherein, while the cross-sectional shape of the turns varies for successive turns, the cross-sectional area of the successive turns remains constant.

3. The 3D printed metal coil of claim 1, wherein each turn has a square or rectangular cross-section in the slot.

4. The 3D printed metal coil of claim 1, wherein a portion of each turn forming an end winding of the 3D printed metal coil has a flat plate-like shape for dissipating heat from the end winding.

5. The 3D printed metal coil of claim 4, wherein a cross-sectional shape of the turns transitions from a first cross-section in the slot to the flat plate-like shape at the portion of the turn that forms the end winding of the 3D printed metal coil.

6. The 3D printed metal coil of claim 5, wherein, while the cross-sectional shape of the turns transition from the first cross-section to the flat plate-like shape, a cross-sectional area of the turns remains constant.

7. The 3D printed metal coil of claim 1, comprising 3D printed termination features at the ends of the 3D printed metal coil.

8. The 3D printed metal coil of claim 1, further comprising insulation between the turns to electrically insulate the turns from each other.

9. The 3D printed metal coil of claim 8, wherein the insulation incorporates spacers physically separating successive turns from each other.

10. The 3D printed metal coil of claim 8, wherein the insulation comprises a dielectric resin.

11. The 3D printed metal coil of claim 1, wherein the metal is copper.

12. An electrical machine comprising:
a plurality of teeth forming a plurality of slots;
a plurality of 3D printed metal coils within said plurality of slots, wherein each 3D printed metal coil comprises a plurality of turns and a cross-sectional shape of successive turns of the plurality of turns varies such that a portion of each turn forms a part of an external surface of the 3D printed metal coil, the external surface forming an interface with a side of a slot, and each 3D printed metal coil comprises one or more 3D printed pockets in a coil layer of the 3D printed metal coil for thermocouples or other sensors.

13. The electrical machine of claim 12, wherein, for each 3D printed metal coil, the portion of the turn that forms part of the external surface of the 3D printed metal coil forms a heat sink to the side of the slot.

14. The electrical machine of claim 12, wherein, while the cross-sectional shape of the turns varies for successive turns, the cross-sectional area of the successive turns remains constant.

15. The electrical machine of claim 12, wherein, for each 3D printed metal coil, a portion of each turn forming an end winding of the 3D printed metal coil has a flat plate-like shape for dissipating heat from the end winding.

16. The electrical machine of claim 15, wherein a cross-sectional shape of the turns transitions from a first cross-section in the slot to the flat plate-like shape at the portion of the turn that forms the end winding of the 3D printed metal coil.

17. The electrical machine of claim 16, wherein, while the cross-sectional shape of the turns transition from the first cross-section to the flat plate-like shape, a cross-sectional area of the turns remains constant.

18. The electrical machine of claim 12, wherein, for each 3D printed metal coil, each turn has a square or rectangular cross-section in the slot.

* * * * *